Figure 1:
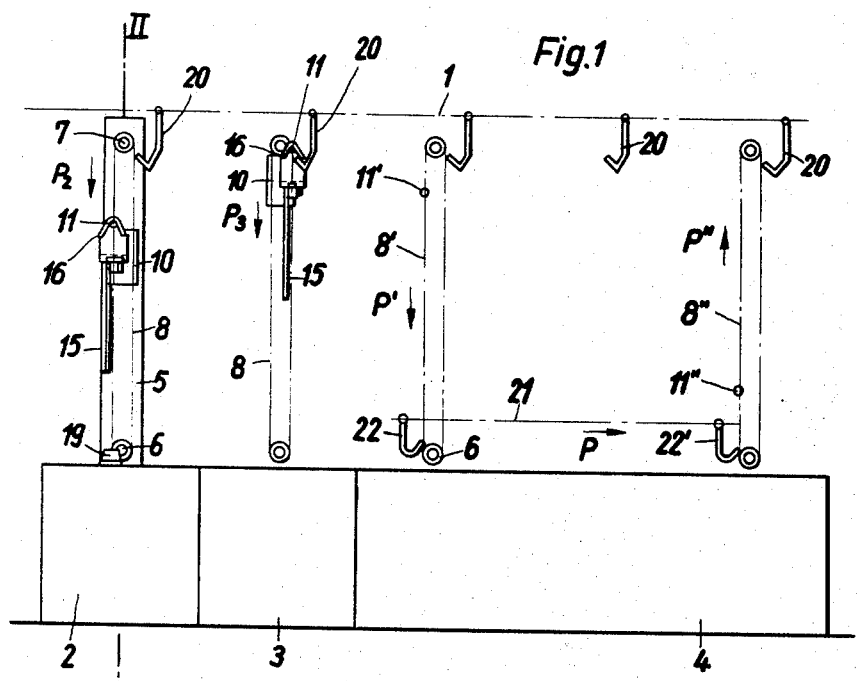

Dec. 10, 1968 H. STRECKE 3,415,398
CONVEYOR SYSTEMS
Filed Dec. 15, 1964 2 Sheets-Sheet 1

Inventor:
Heinz Strecke
by Michael S. Striker

Dec. 10, 1968  H. STRECKE  3,415,398
CONVEYOR SYSTEMS
Filed Dec. 15, 1964  2 Sheets-Sheet 2
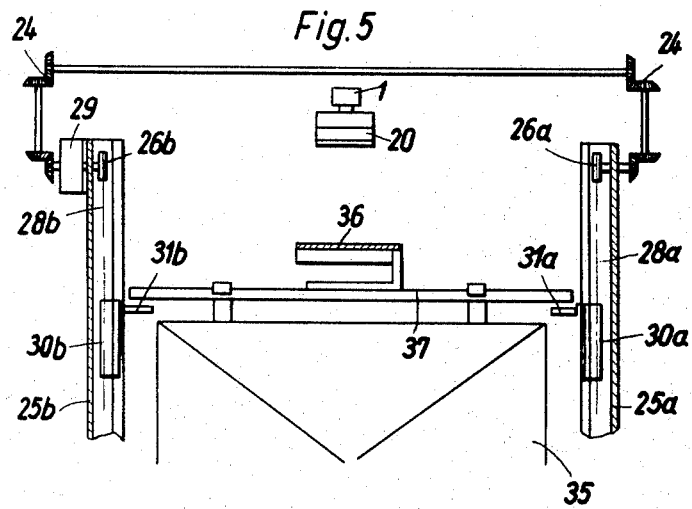
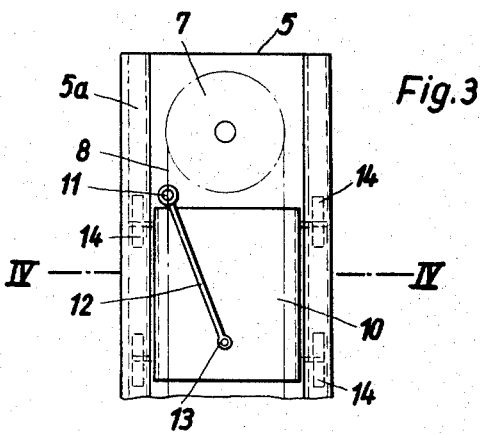
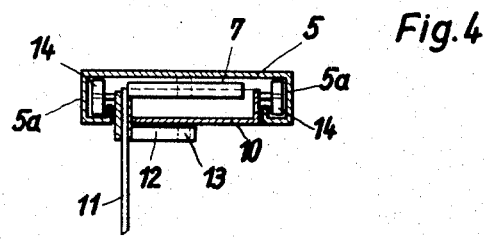
Inventor:
Heinz Strecke
by Michael J. Striker

United States Patent Office 3,415,398
Patented Dec. 10, 1968

3,415,398
CONVEYOR SYSTEMS
Heinz Strecke, Lindenbaumstrasse 13,
Solingen, Germany
Filed Dec. 15, 1964, Ser. No. 418,472
2 Claims. (Cl. 214—89)

This invention relates to conveyor systems and to transfer means for use therein. It is particularly concerned with the adaption of such systems for use in the processing, e.g. galvanisation, of articles although it can also be employed in carrying out similar operations requiring the immersion of articles or their transference to a lower level for other processing.

It is an object of the invention to provide a transfer device which can be used in conjunction with a conveyor run to enable such operations to be performed and which is of relatively simple construction while not taking up any great floor space and permitting some flexibility of operation in the running of the system.

The present invention provides, for the removal and deposit of an article or article suspension device from and to entrainment means on a conveyor run, a transfer device comprising an endless chain extending vertically so as to form two vertical runs separated by top and bottom reversal stages and which has a pick-up member secured to it to engage said article, said member being movable by the chain through the top reversal stage to remove or deposit said article.

It is to be understood that the term "chain" as used in the specification also includes such equivalent means as conveyor belts. The articles to be processed are, for galvanisation, usually secured to special holders or received in receptacles which have a suspension device enabling them to be secured in readily releasable manner to the pick-up members of the lifting device and of the conveyor run. The suspension device can be, for instance, a hook. The pick-up member of the lifting device can also be a hook or else take some other form, for instance, a pin or projection secured to the chain.

The pick-up member of the transfer device may be secured to a carriage which is guided parallel to the chain by a supporting frame or, in a modification of this arrangement, it can be secured to the chain and a carriage guided parallel to the vertical runs of the chain can have a lever pivoted to it, this lever forming a further support for the pick-up member.

If desired, it is possible to provide at a particular station along the conveyor run respective transfer devices at opposite sides of the run, the two devices being synchronised with each other to transfer said article jointly to and from the run.

In particular cases, it is also possible to use transfer devices according to the invention to convey articles from one horizontal conveying chain to another. Thus, where a second conveyor run is provided below the first, there can be two transfer devices spaced along the length of the runs to transfer articles, respectively, from the first to the second run and from the second to the first run, the transfer, at the second run, being arranged to be performed by moving the member through the bottom reversal stage of the chain.

Figure 2:
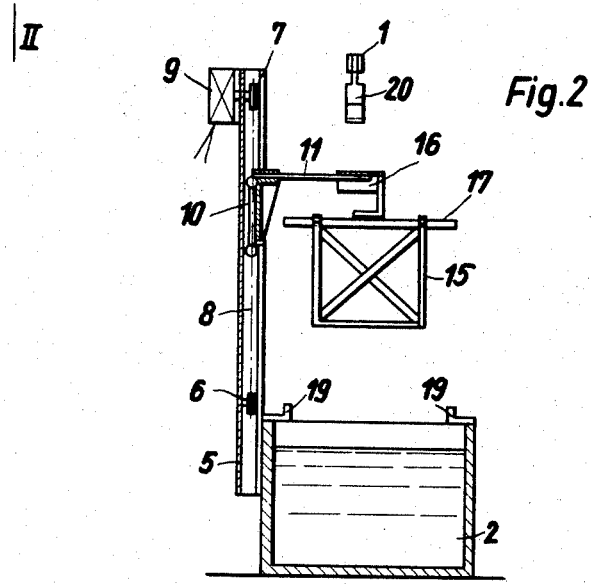

The invention will be more particularly described with reference to the accompanying drawings wherein:

FIG. 1 is a side elevation of one embodiment of a dipping plant incorporating transfer devices according to the invention, FIG. 2 is a longitudinal section taken along the line II—II of FIG. 1, FIG. 3 is a view to an enlarged scale of part of a transfer device illustrated in FIGS. 1 and 2, FIG. 4 is a section taken along the line IV—IV of FIG. 3, and FIG. 5 illustrates a part of another conveyor system incorporating transfer devices according to the invention.

In the arrangement illustrated in FIGS. 1 to 4 of the drawings, a horizontal conveying chain 1, represented in FIG. 1 simply by a chain-dotted line, runs above a number of galvanising plant treatment stations. Three such baths 2, 3 and 4 are shown in FIG. 1. Rigidly connected to each of the two tanks of the baths 2, 3 are respective transfer devices each comprising a metal frame 5 which is substantially formed by a vertical channel and can have, for instance, a cross-section as illustrated in FIG. 4. Mounted in the frame 5 are two sprockets 6, 7 around which runs a chain 8, the sprocket 7 being rotated by an electric motor 9. The chain 8 has a carriage 10 which can be secured to it and which is vertically guided by the frame 5. The carriage 10 has a pick-up member 11 in the form of a strong pin projecting transversely and the carriage 10 is so guided that the pin 11 is always horizontal. By appropriate control of the motor 9, the chain 8 can be rotated to one or the other hand so that the pin 11 can rise or descend vertically and can be moved around the top of the sprocket 7.

In principle, the pick-up member or pin 11 can be rigidly secured to a carriage 10 which is secured to the chain 8 as described above. In the embodiment illustrated, as can be seen in FIGS. 3 and 4, the pick-up member 11 is secured to the chain 8 and is also attached to a lever 12 pivotable around a pivot pin 13 secured to the carriage 10. The carriage has four rollers 14 which run in matching guiding channels 5a in the frame 5. The pick-up member 11 moves with the chain 8 along the left-hand vertical run thereof and over the top sprocket 7 as far as the top part of the right-hand vertical run, but the carriage 10 in this construction will merely move vertically up and down.

A suspension device for the articles to be galvanised, a frame 15 is shown in FIGS. 1 and 2, and the articles for galvanising can be connected to the frame 15 in any known manner. At its top end the frame 15 has a hook 16, engageable by the respective pick-up members 11, 20 of the chains 8, 1, and a cross-bar 17 of a length such as to be adapted to settle upon matching projections 19 of the tanks, for instance, of the bath 2, when the suspension device 15 is lowered. The horizontal chain 1 has a number of hooks 20 along its length.

FIG. 1 also shows a modification of the system in that another horizontal chain 21, which has hooks 22, is disposed below the first chain 1 in a plane only slightly above the long bath 4.

This arrangement described operates in the following manner. The hook 16 of the suspension device 15 carrying articles for treatment will be assumed to be suspended on the pick-up member 11 of the transfer device which is associated with the bath 2. The motor 9 is controlled so that the chain 8 moves anticlockwise in the direction indicated by an arrow $P_2$, the suspension device 15 therefore being lowered towards the bath 2. When the cross-bar 17 engages with the projections 19, the motor 9 is stopped. The articles carried by the suspension device 15 are then treated in the bath 2 for the required time. During the treatment the motor 9 can be briefly run in both directions alternately to move the suspension device 15 up and down in the bath periodically by small amounts, for instance, of a few centimeters.

At the end of the treatment time in the bath 2 the motor 9 is started so that the pick-up device 11 and the suspension device 15 thereon are conveyed upwards. Simultaneously, the horizontal chain 1 is so moved—or else has previously been so moved—that one of the hooks 20 of the chain 1 is so near the path of the chain 8 that, as the pick-up member 11 runs around the sprocket 7, the hook 16 of the suspension device 15 is transferred to the hook 20 of the horizontal chain 1. The chain 1 can then be moved until the hook 20 comes into a similar position opposite another transfer device, for instance, the lifting device associated with the bath 3. When the chain 8 of this second transfer device is then rotated anti-clockwise in the direction indicated by an arrow $P_3$, its member 11 disengages the hooks 16 and the suspension device 15 thereon from the hook 20 and conveys the suspension device 15 into the bath 3.

A second horizontal chain 21 can be used for conveying through the bath 4 a suspension device 15 having articles for galvanising attached to it. For this purpose, the suspension device 15 is first transferred, from a hook 20 of the horizontal chain 1, to a pick-up member 11' of the chain 8' and this device, which runs in a direction indicated by an arrow P', disengages the suepension device 15 from the hook 20 and conveys the device 15 downwards to the horizontal chain 21 where the suspension device 15 is transferred from the pick-up member 11' to a pick-up device 22 of the horizontal chain 21. This chain then moves the suspension device 15 in the direction indicated by an arrow P until the hook 22 has reached a position 22'. A pick-up member 11" of a chain 8" running in the direction indicated by an arrow P" then disengages the suspension device hook 16 from the hook 22' and conveys the suspension device 15 upwards for transfer to a hook 20 of the horizontal chain 1.

The arrangement illustrated in FIG. 5 differs from the arrangement illustrated in the earlier figures in that there is provided, at opposite sides of a station, two frames 25a, 25b, one chain 28a, 28b running in each such frame. Each chain is connected to a respective carriage 30a, 30b each having a respective pick-up member 31a, 31b in the form of a support plate. In this embodiment, articles for galvanising are received by a suspension device having at its top end a rod 37 which extends to both sides above the pick-up members 31a, 31b, and which has a hook 36 corresponding to the hook 20 of the pick-up member of the horizontal chain 1. One sprocket 26b is driven by a motor 29 and is so connected to the sprocket 26a of the other chain 28a through gearing 24 that the sprockets 26a, 26b run in synchronism with one another. An arrangement of this kind is applicable more particularly in cases where the articles for treatment are too heavy to be borne by a single cantilevered bearing or support arm such as the member 11.

What I claim is:

1. In a conveyor system, a first conveyor arranged to travel in a substantially horizontal path and provided with a plurality of spaced article-supporting holders; two additional conveyors respectively travelling in a substantially vertical path and each provided with at least one article-supporting carrier movable between an uppermost and a lowermost position, said carriers of said additional conveyors being arranged to receive articles from or to deliver articles to said holders of said first conveyor in one of said positions; an upper and a lower guide wheel associated with each of said additional conveyors and about which the latter are respectively guided; carriage means respectively associated with said additional conveyors, said carriers being pivotally affixed to the respective carriage means and further to the respective additional conveyors so that relative movement of the carriage means and the respective additional conveyor results in pivotal movement of the associated carrier; and reversible drive means for driving said additional conveyors and reserving the direction of travel of the same in response to the respective carrier reaching one of said positions.

2. In a conveyor system, a first conveyor arranged to travel in a substantially horizontal path and provided with a plurality of spaced article-supporting holders; two additional conveyors respectively travelling in a substantially vertical path and each provided with at least one article-supporting carrier movable between an uppermost and a lowermost position, said carriers of said additional conveyors being arranged to receive articles from or to deliver articles to said holders of said first conveyor in one of said positions; an upper and a lower guide wheel associated with each of said additional conveyors and about which the latter are respectively guided, said first conveyor extending from one at least to the other of said additional conveyors adjacent the respective upper guide wheels thereof; a second substantially horizontal conveyor extending from one to the other of said additional conveyors adjacent the respective lower guide wheels thereof; and reversible drive means for driving said additional conveyors and reversing the direction of travel of the same in response to the respective carrier reaching one of said positions.

References Cited
UNITED STATES PATENTS

| | | | |
|---|---|---|---|
| 1,793,062 | 2/1931 | Collier | 198—158 |
| 2,854,159 | 9/1958 | Abbey | 198—19 X |
| 2,997,191 | 8/1961 | Finston | 214—89 |
| 3,013,302 | 12/1961 | Croxton | 214—89 X |
| 3,013,678 | 12/1961 | Clark | 214—89 |
| 3,088,610 | 5/1963 | Pianowski | 214—89 |
| 2,048,937 | 7/1936 | Larson. | |

ALBERT J. MAKAY, *Primary Examiner.*